S. Rex.
Harvester.
№ 76522   Patented Apr. 7, 1868.

Witnesses
H. C. Ashketter
J. Fraser

Inventor
S. Rex
per Munn &
attorneys

United States Patent Office.

STEPHEN REX, OF OREFIELD, PENNSYLVANIA.

Letters Patent No. 76,522, dated April 7, 1868.

IMPROVEMENT IN HARVESTERS.

The Schedule referred to in these Letters Patent and making part of the same.

TO ALL WHOM IT MAY CONCERN:

Be it known that I, STEPHEN REX, of Orefield, in the county of Lehigh, and State of Pennsylvania, have invented a new and improved Safety-Lock for Harvesters; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

Figure 1:
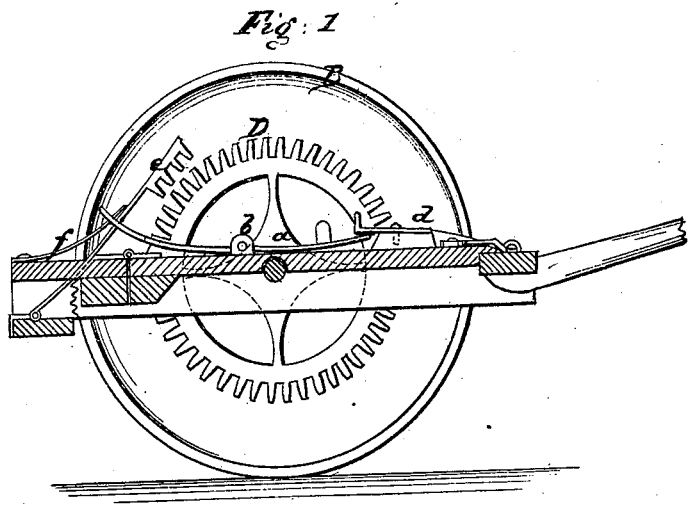
Figure 1 is a vertical section of my invention through the line $x\ x$, fig. 2.
Figure 2:
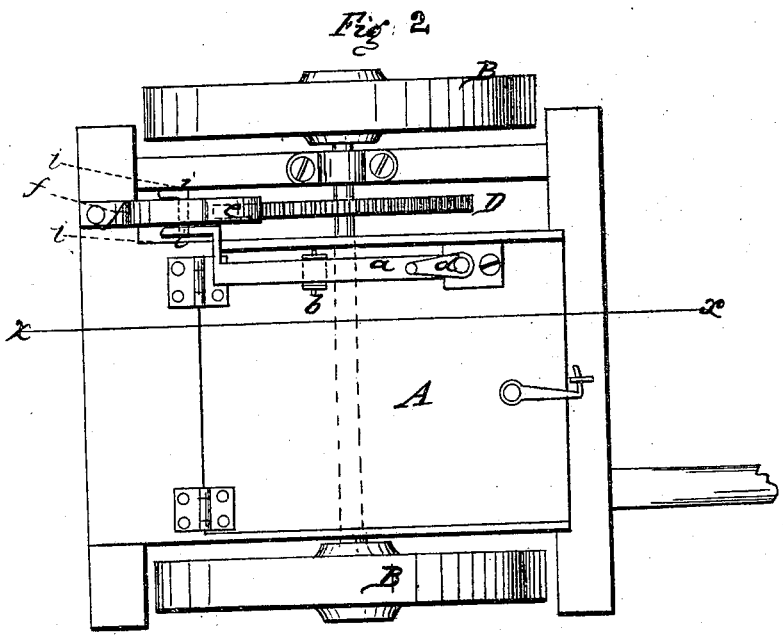
Figure 2 is a top view of the same.

The object of this invention is to accomplish the instantaneous locking of a reaping or mowing-machine when the driver shall fall therefrom, and thereby prevent any injury to the driver from the cutters or knives of the machine.

In the accompanying plate of drawings some one cog-wheel of the gearing, connecting the drive-wheels B with the knives or cutters, is shown at D. This wheel may be keyed on the shaft of the driving-wheels B, as shown, or may be some intermediate wheel of the gearing.

A toothed locking-pawl is shown at $e$, which is hinged to any convenient part of the frame of the machine, as shown.

A spring, $f$, actuates the pawl to mesh its teeth into the teeth of the wheel D, when the lever $a$ is liberated. This lever is pivoted by lugs $b$, or in any other suitable manner, to some point on the main frame, and its lifting-end is bent to pass under the pawl to enclose it between the projections $i\ i$ of the said lever.

When the machine is reaping or mowing, the driver retains one foot upon the free end of the lever, and when from any cause he shall be thrown or fall from the machine, the locking-pawl will descend, and its teeth will engage with the teeth of the wheel D, and thereby stop the gearing of the cutters or knives.

A button, $d$, may be employed to keep the pawl raised when the driver walks by the side of the machine.

In oiling and otherwise moving about in front of the machine, it often occurs that the horses start to move off or run. If the machine is provided with my improvements, there will be less danger in attempting to stop them than when the machine is not so provided.

My invention is simple and inexpensive, and can be easily applied to the machines already in use.

I claim as new, and desire to secure by Letters Patent—

The locking-pawl $e$, lifting-lever $a$, and spring $f$, substantially as shown and described, when combined with any toothed wheel of the gearing, operating the cutters or knives of a reaping or mowing-machine, all as and for the purpose set forth.

STEPHEN REX.

Witnesses:
EDWARD BECK,
JOHN RUPP.